US010177930B1

(12) United States Patent
Bodkin et al.

(10) Patent No.: US 10,177,930 B1
(45) Date of Patent: Jan. 8, 2019

(54) SMART THERMOSTAT CONTROL SYSTEM

(71) Applicant: Wells Fargo Bank, N.A., San Francisco, CA (US)

(72) Inventors: Joseph George Bodkin, South Burlington, VT (US); John Edward Cronin, Bonita Springs, FL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 200 days.

(21) Appl. No.: 15/062,639

(22) Filed: Mar. 7, 2016

(51) Int. Cl.
*H04L 12/28* (2006.01)
*G05B 13/02* (2006.01)
*F24F 11/62* (2018.01)
*F24F 11/30* (2018.01)

(52) U.S. Cl.
CPC .............. *H04L 12/28* (2013.01); *F24F 11/62* (2018.01); *G05B 13/026* (2013.01); *H04L 12/2803* (2013.01); *F24F 11/30* (2018.01)

(58) Field of Classification Search
CPC ...... H04L 12/28; H04L 12/2803; F24F 11/62; F24F 11/30; G05B 13/026
See application file for complete search history.

(56) References Cited

U.S. PATENT DOCUMENTS

| 7,317,404 | B2 | 1/2008 | Cumeralto et al. |
| 9,020,646 | B2 | 4/2015 | Matsuoka et al. |
| 2006/0111796 | A1 | 5/2006 | Van Heteren |
| 2008/0177678 | A1 | 7/2008 | Di Martini et al. |
| 2011/0046792 | A1* | 2/2011 | Imes ................ H04L 67/42 700/278 |
| 2011/0153525 | A1* | 6/2011 | Benco ................ G01S 5/0027 705/412 |
| 2012/0029725 | A1 | 2/2012 | Lafleur et al. |
| 2012/0086562 | A1* | 4/2012 | Steinberg .......... G05D 23/1923 340/12.32 |
| 2012/0086563 | A1 | 4/2012 | Arling et al. |
| 2013/0030600 | A1* | 1/2013 | Shetty ................ F24F 11/006 700/300 |
| 2013/0178985 | A1 | 7/2013 | Lombard et al. |
| 2013/0231784 | A1 | 9/2013 | Rovik et al. |
| 2014/0058572 | A1 | 2/2014 | Stein et al. |

(Continued)

OTHER PUBLICATIONS

Barrentine, UA-Developed Technology Helps Find Happy Middle Between Low Temps and High Bills, UA College of Engineering, http://uanews.org/story/ua-developed-technology-helps-find-happy-middle-between-low-temps-and-high-bills, Jun. 25, 2014, 6 pages.

(Continued)

*Primary Examiner* — Ajay Ojha
(74) *Attorney, Agent, or Firm* — Merchant & Gould P.C.

(57) ABSTRACT

Information regarding a user's personal schedule is received at an electronic computing device. Information regarding current and future utility costs is received. The information regarding the user's personal schedule, the information regarding the user's location and the information regarding the current and future utility costs is used to determine at least one financial impact based on a temperature setting. The at least one financial impact includes estimated costs for time intervals and historical billing cycles. A temperature effecting device or an energy effecting device in the home of the user is controlled using the at least one financial impact.

16 Claims, 21 Drawing Sheets

(56) References Cited

U.S. PATENT DOCUMENTS

2014/0067132 A1 3/2014 MacEk et al.
2014/0222219 A1 8/2014 Wen

OTHER PUBLICATIONS

Smart Thermostats in the UK: Nest and its rivals compared, Trusted Reviews, http://www.trustedreviews.com/opinions/smart-thermostats-in-the-uk-will-nest-and-its-rivals-take-control-in-2014_Page-2, Nov. 6, 2014, 8 pages.

* cited by examiner

| Device | Peak Hours | Non-Peak Hours |
|---|---|---|
| Heat | 25% | 100% |
| AC | 25% | 100% |
| Fan | 30% | 100% |
| Garage | Open/Close | Open/Close |
| Lights | 50% | 100% |

FIG. 12

| Date | Time | Location | Temperature | Conditions | Chance of Precipitation |
|---|---|---|---|---|---|
| 7/27/2015 | 9:00 AM | X, Y, Z | 70 | Cloudy | 40% |
| 7/27/2015 | 9:15 AM | X, Y, Z | 70 | Cloudy | 40% |
| 7/27/2015 | 9:30 AM | X, Y, Z | 71 | Cloudy | 40% |
| 7/27/2015 | 9:45 AM | X, Y, Z | 72 | Partly Cloudy | 30% |
| 7/27/2015 | 10:00 AM | X, Y, Z | 74 | Partly Cloudy | 30% |
| 7/27/2015 | 10:15 AM | X, Y, Z | 75 | Partly Cloudy | 30% |
| 7/27/2015 | 10:30 AM | X, Y, Z | 76 | Partly Sunny | 20% |
| 7/27/2015 | 10:45 AM | X, Y, Z | 78 | Partly Sunny | 20% |
| 7/27/2015 | 11:00 AM | X, Y, Z | 79 | Partly Sunny | 20% |
| 7/27/2015 | 11:15 AM | X, Y, Z | 81 | Partly Sunny | 20% |
| 7/27/2015 | 11:30 AM | X, Y, Z | 81 | Partly Sunny | 20% |
| 7/27/2015 | 11:45 AM | X, Y, Z | 82 | Sunny | 0% |
| 7/27/2015 | 12:00 PM | X, Y, Z | 83 | Sunny | 0% |
| 7/27/2015 | 12:15 PM | X, Y, Z | 84 | Sunny | 0% |
| 7/27/2015 | 12:30 PM | X, Y, Z | 85 | Sunny | 0% |
| 7/27/2015 | 12:45 PM | X, Y, Z | 85 | Sunny | 0% |
| 7/27/2015 | 1:00 PM | X, Y, Z | 85 | Sunny | 0% |

FIG. 14

| Month | Week Of | Estimated Cost | Days Available | Times Available |
|---|---|---|---|---|
| July | 26th | $250 | None | None |
| August | 2nd | $300 | Wednesday | 12pm-2pm |
| August | 9th | $350 | Tuesday, Thursday | 9am-11am,3pm-5pm |
| August | 16th | $400 | Tuesday, Wednesday | 10am-12am,3pm-4pm |
| August | 23rd | $300 | None | None |
| August | 30th | $450 | All | 9am-5pm |
| September | 6th | $450 | All | 9am-5pm |
| September | 13th | $450 | All | 9am-5pm |

FIG. 16

SMART THERMOSTAT CONTROL SYSTEM

BACKGROUND

Thermostats are home automation devices that can control a home's heating and air conditioning. A thermostat can be programmed to set different temperatures for the home for different times of a day.

Homeowners often have schedules that are not consistent with the way the thermostat is programmed. When a homeowner arrives home earlier than expected, the temperature of the home may be cooler or warmer than the homeowner expected.

SUMMARY

Embodiments of the disclosure are directed to a method implemented on an electronic computing device for controlling a temperature of a home, the method comprising: on the electronic computing device, receiving information regarding a user's personal schedule; receiving information regarding the user's location; receiving information regarding current and future utility costs; using the information regarding the user's personal schedule, the information regarding the user's location and the information regarding the current and future utility costs to determine at least one financial impact based on a temperature setting, wherein the at least one financial impact includes estimated costs for time intervals and historical billing cycles; and controlling a temperature effecting device or an energy effecting device in the home of the user using the at least one financial impact.

In another aspect, a smart thermostat comprises a processing unit and system memory. The system memory includes including instructions which, when executed by the processing unit, cause the smart thermostat to: receive information regarding a user's personal schedule; receive information regarding the user's location; receive information regarding current and future weather conditions; receive information regarding current and future utility costs for the user; and use the information regarding the user's personal schedule, the information regarding the user's location, the information regarding the current and future weather conditions and the information regarding the current and future utility costs to control one or more temperature effecting devices for the user.

In yet another aspect, an electronic computing device includes a processing unit; and system memory, the system memory including instructions which, when executed by the processing unit, cause the electronic computing device to: receive information regarding a user's personal schedule, the information regarding the user's personal schedule being obtained from a schedule database on a second electronic computing device, the second electronic computing device being one of a smartphone, a tablet computer, a laptop computer or a desktop computer; receive information regarding the user's location, the information regarding the user's location being obtained from global positioning system (GPS) software of the second electronic computing device; receive information regarding current and future weather conditions, the information regarding the current and future weather conditions being obtained from a weather database external to the first electronic computing device; receive information regarding current and future utility costs for the user, the information regarding the current and future utility costs for the user being obtained from a utility database external to the first electronic computing device; and use the information regarding the user's personal schedule, the information regarding the user's location, the information regarding the current and future weather conditions and the information regarding the current and future utility costs for the user to adjust a temperature effecting device in the home, comprising: obtain a current temperature inside the home; use the user's personal schedule and the user's location to determine when the user will arrive home; determine a preferred temperature for the home based on when the user will arrive home; calculate a deviation between the current temperature inside the home and the preferred temperature for the home; based on the temperature deviation, select the temperature effecting device to heat or cool the home; and use the temperature effecting device to adjust the temperature of the home to the preferred temperature.

The details of one or more techniques are set forth in the accompanying drawings and the description below. Other features, objects, and advantages of these techniques will be apparent from the description, drawings, and claims.

DESCRIPTION OF THE DRAWINGS

FIG. 12 shows an example smart thermostat usage database.

FIG. 14 shows an example external data network weather database structure.

FIG. 16 shows an example external network fuel database structure.

DETAILED DESCRIPTION

Figure 1:
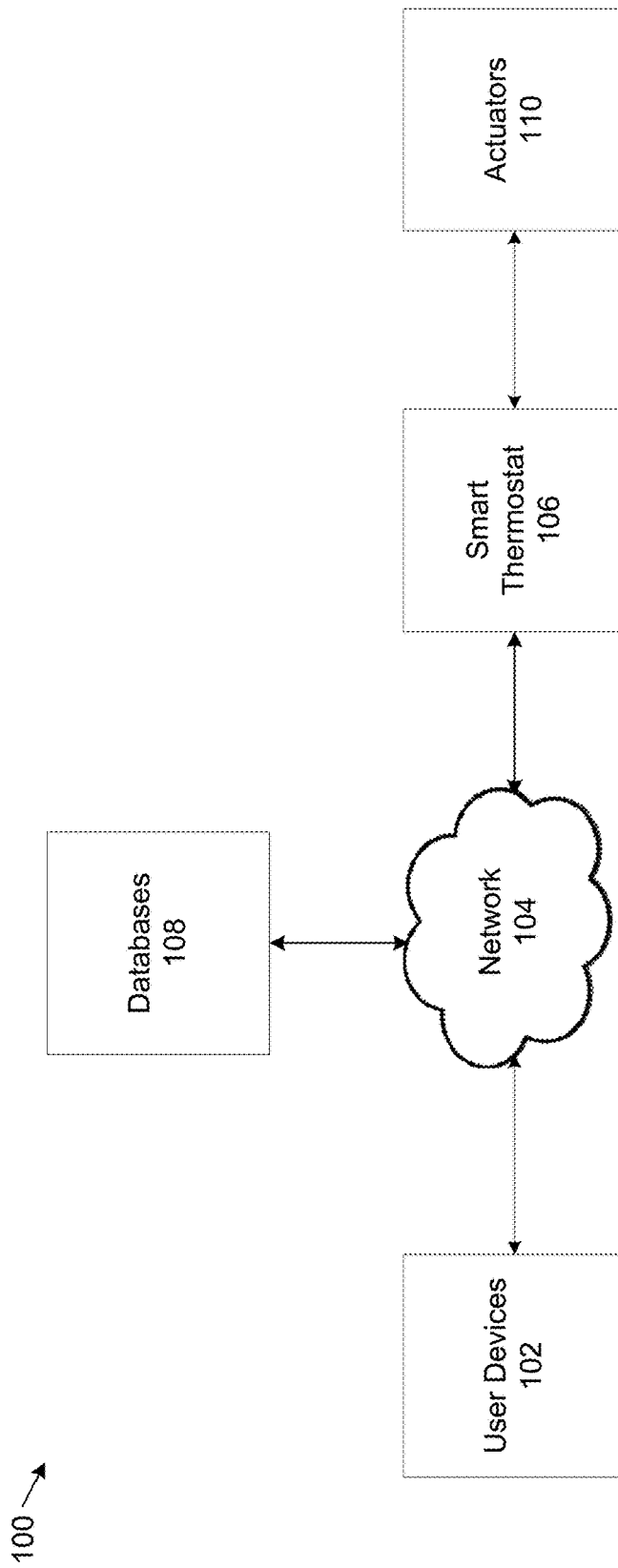
FIG. 1 shows an example system that supports a smart thermostat control system.

The present disclosure is directed to systems and methods of a smart thermostat that can integrate a user's personal schedule with a user's actual location to more accurately adjust a temperature in the user's home. The systems and methods also can use knowledge of current and future utility costs and current and future weather conditions to adjust the temperature in the user's home.

The temperature can be adjusted by remotely controlling a heating, ventilating and air conditioning (HVAC) system or other temperature effecting devices that can be remotely controlled. The other temperature effecting devices that can be remotely controlled can include a garage door, automatic window blinds and lights. Other temperature effecting devices are possible. In this disclosure, a temperature effecting device is a device that can be used to impact (e.g., heat or cool) the home. In this disclosure the temperature effecting devices are referred to as connected devices, because the energy connected devices can be connected to a network, such as the Internet, and controlled remotely.

The systems and methods can also use the knowledge of current and future utility costs to adjust energy effecting devices in the home. Examples of energy effecting devices can include televisions and refrigerators. Other examples of energy effecting devices are possible. In this disclosure, an energy effecting device is a device can have an impact on energy use in the home.

Using the systems and methods, the user's actual location can be determined by a global positioning system (GPS) location for the user. For example, the smart thermostat can obtain the user's actual location from a smart phone with GPS capability that is carried by the user. The smart thermostat can obtain current and future weather conditions from an external weather database. The smart thermostat can obtain current and future utility costs from an external utility database.

The smart thermostat can use the information regarding the user's actual location, the current and future weather conditions and the current and future utility costs to optimize adjustments in heating or cooling of the user's home to arrive at a desired home temperature when the user arrives home, at a lowest utility cost to the user. As described in more detail later herein, the smart thermostat can determine a current temperature in the home, can determine how long it will be before the user arrives home, determine energy costs for the period of time until the user arrives home, determine an optimal temperature effecting device to adjust the temperature and control the heating or cooling adjustment so that the temperature of the home is adjusted in an energy efficient and cost efficient manner.

The systems and methods disclosed herein are directed to a computer technology that solves an existing problem in efficiently processing disparate information from a plurality of remote sources to efficiently control one or more temperature effecting or energy effecting devices in a user's home. Rather than inefficiently polling the remote sources at random or periodic intervals or receiving information updates at random or periodic times from the disparate remote sources, the smart thermostat can request information from the remote sources as determined by a user's personal schedule accessible to the smart thermostat. Requesting information at an appropriate time, rather than randomly, can improve computer processing efficiency at the smart thermostat.

FIG. 1 shows an example system 100 that supports a smart thermostat control system. The example system 100 includes user devices 102, a network 104, a smart thermostat 106, databases 108 and actuators 110. More, fewer or different components can be used.

The example user devices 102 can be any user computing device that includes a graphical user interface (GUI). Examples of user devices 102 can include smartphones, laptop computers, tablet computers and desktop computers. Other user devices 102 are possible. Each of the user devices 102 can include global positioning system (GPS) software and communication channels such as Wi-Fi, Bluetooth, 3G, 4G, ZigBee, etc.

Each of the user devices 102 can have access to or store a user schedule database. In some implementations, the user schedule database can be downloaded or synchronized from a server computer. In other implementations, the user can enter a personal schedule into a user schedule database on user device 102 via a software application on a user device 102.

The example network 104 is a wireless computer network that permits a connection between the user devices 102 and the smart thermostat 106 and between the databases 108 and the smart thermostat 116. An example of network 104 is the Internet.

The example smart thermostat 106 is a programmable thermostat that can receive user inputs across network 104 and control a temperature in a home based on the user inputs. As discussed in more detail later herein, the smart thermostat 106 includes modules for determining optimizations of utility costs based on the user's personal schedule and a current location of the user. The smart thermostat 106 can obtain information regarding weather conditions and utility costs from databases 108. The smart thermostat can obtain information regarding the user's personal schedule from one or more of user devices 102. The smart thermostat can include communication channels such as Wi-Fi, Bluetooth, 3G, 4G, ZigBee, etc. The smart thermostat 106 can also control actuators 110 to heat or cool the home as appropriate.

The example databases 108 comprise a plurality of databases that can provide information that the smart thermostat 106 can use to control the temperature of the home. The databases 108 can include a weather database, a utility database and a fuel database. The weather database can include information on current weather conditions, including hourly temperature predictions. The utility database can include current information regarding utility costs. The fuel database can include information regarding a status of fuel in the user's home, including how many days of fuel may be remaining before the user runs out of fuel. Other example databases 108 are possible.

The example actuators 110 are connected to temperature effecting devices that can be used to adjust a temperature in the home and to energy effecting devices that can control energy use in the home. The example actuators 110 can include a HVAC system, a garage door, lights, automatic window blinds, televisions and refrigerators. Other actuators 110 are possible.

Figure 2:
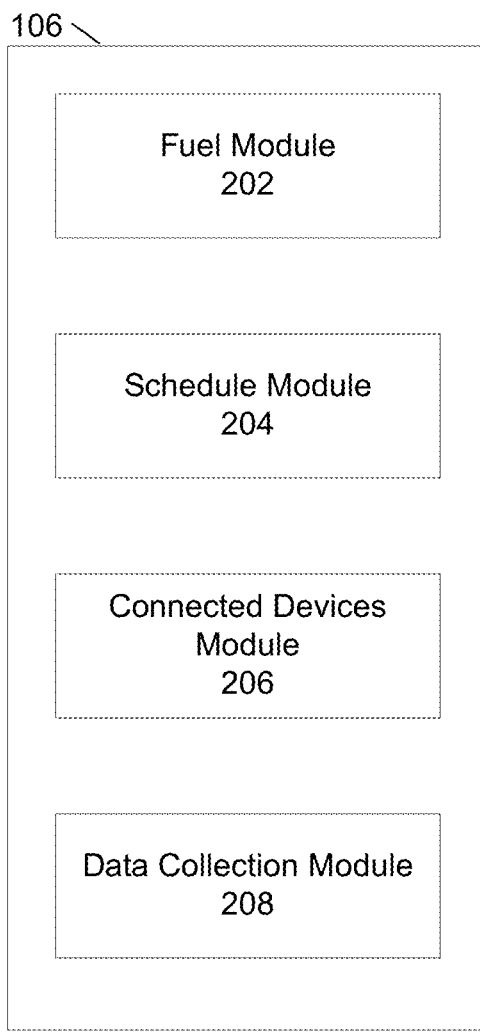
FIG. 2 shows example modules of the smart thermostat control system of FIG. 1.

FIG. 2 shows example modules of the smart thermostat 106. The example modules include a fuel module 202, a schedule module 204, a connected devices module 206 and a data collection module 208. More, fewer or different modules are possible.

The smart thermostat 106 can also include a plurality of databases. Some of the databases can be maintained on the smart thermostat 106, including a usage database and a device database. Portions of other databases can be downloaded to the smart thermostat 106 from external sources. For example, a user's personal schedule can comprises a database that can be downloaded from a user device 102. Portions of other databases that can be downloaded to the smart thermostat 106, can include portions of the weather database, the utility database and the utility database.

The example fuel module 202 can obtain a current status regarding fuel remaining in the home, determine an optimal time for fuel delivery, based on a user's personal schedule and fuel costs during a day, schedule a fuel delivery and add an appointment for the fuel delivery to the user's personal schedule. The fuel module 202 can obtain information regarding the optimal time for fuel delivery from a plurality of databases including the fuel database, the weather database and the utility database.

The example schedule module 204 can obtain current indoor and outdoor temperatures, obtain a user's personal schedule and current location for the user, can obtain utility costs for a current time frame, determine an optimal connected device to use and schedule the optimal connected device to run at an optimal time so that the home will be at a desired temperature when the user enters the home. The schedule module 204 can obtain information from a plurality of databases including the weather database, the utility database and the user schedule database.

The example connected devices module 206 can receive instructions from the schedule module 204 and control a selected connected device to adjust the temperature in the home. The selected connected device can be one of a HVAC device, a garage door, lights, automatic window blinds, a television, a refrigerator or another device. Controlling the connected device can comprise identifying peak energy times from the utility database, obtaining a percentage of usage from the usage database and activating the connected device at an optimal time to adjust the temperature in the home to the desired value.

The connected devices module 206 can be configured to control the connected devices based upon other parameters, such as the user's personal schedule as provided by the schedule module 204. For example, the connected devices module 206 can be programmed to only open the garage door or window when the user is as home for safety reasons. In other examples, the connected devices module 206 can be programmed to only modulate certain lights in the home when the user is not at home (to minimize nuisance to the user if, for example, the user is current in a room using a particular light). Such programmed can be based upon the user's personal schedule and/or proximity information associated with the user (i.e., locating the user within the home). Other configurations are possible.

The example data collection module 208 can send a request for the user schedule database and GPS location and receive the user schedule database and GPS location from a user device 102. The data collection module 208 can also send a request to one or more of databases 108 for the weather database and the utility database and receive and save copies of these databases on smart thermostat 106.

Figure 3:
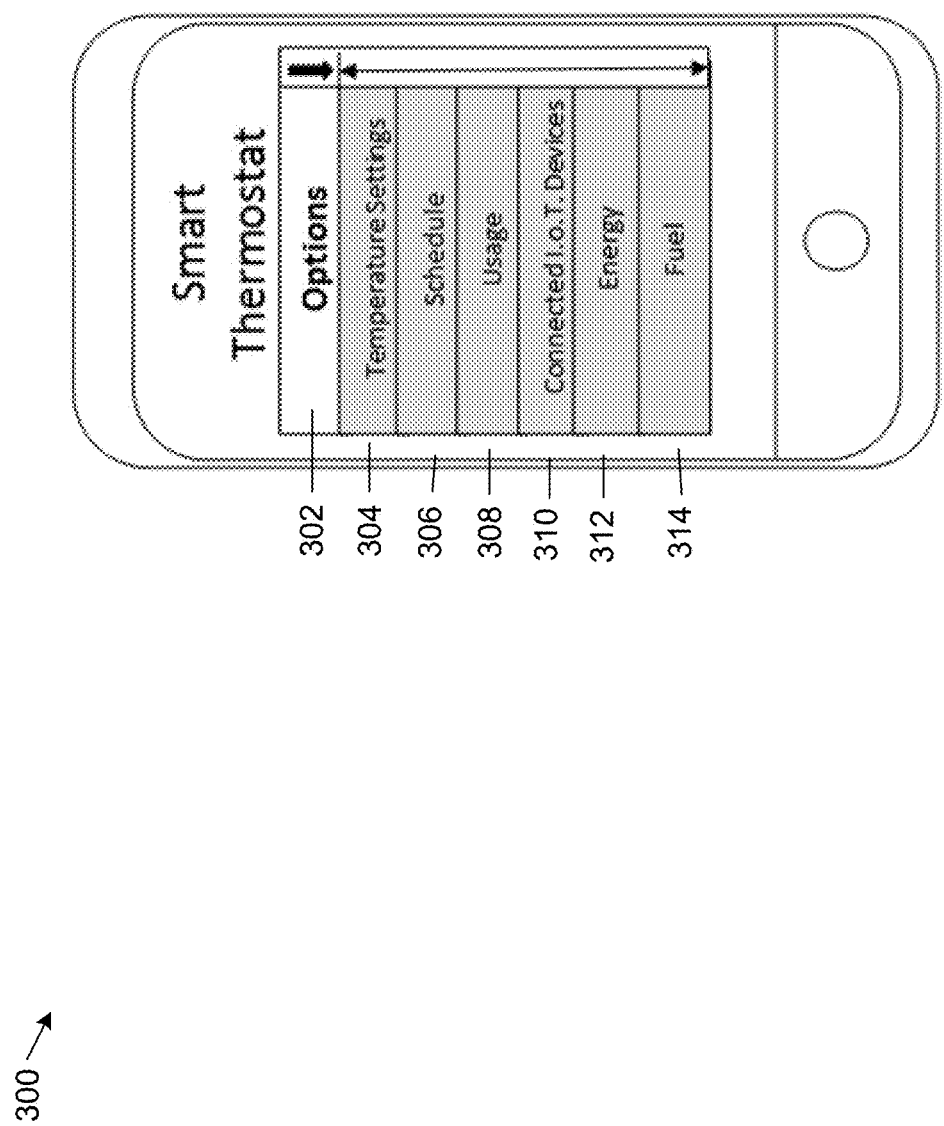
FIG. 3 shows an example user interface of a user device of FIG. 1.

FIG. 3 shows an example user interface 300 of a user device 102. The user interface displays a plurality of options 302. The options 302 include temperature settings 304, schedule 306, usage 308, connected I.o.T devices 310, energy 312 and fuel 314. When temperature settings 304 is selected, a user interface for programming temperatures into smart thermostat 106 is displayed, as described with regard to FIG. 4 later herein. When schedule 306 is selected, a user interface for entering the user's schedule into user device 102 is displayed, as described with regard to FIG. 5 later herein. When usage 308 is selected, a user interface that shows information regarding energy usage and energy costs for the home is displayed, as described with regard to FIG. 6 later herein. When connected I.o.T devices 310 is selected, a user interface showing and permitting a selection of available connected devices is displayed, as described with regard to FIG. 7 later herein. In this disclosure, "I.o.T" refers to Internet of Things—corresponding to energy controlling devices that are connected to and that can be remotely operated over the Internet. When energy 312 is selected, a user interface showing and permitting a selection of available energy options for smart thermostat 106 is displayed, as described with regard to FIG. 8 later herein. When fuel 314 is selected, a user interface permitting a scheduling of a fuel delivery is displayed, as described with regard to FIG. 9 later herein.

Figure 4:
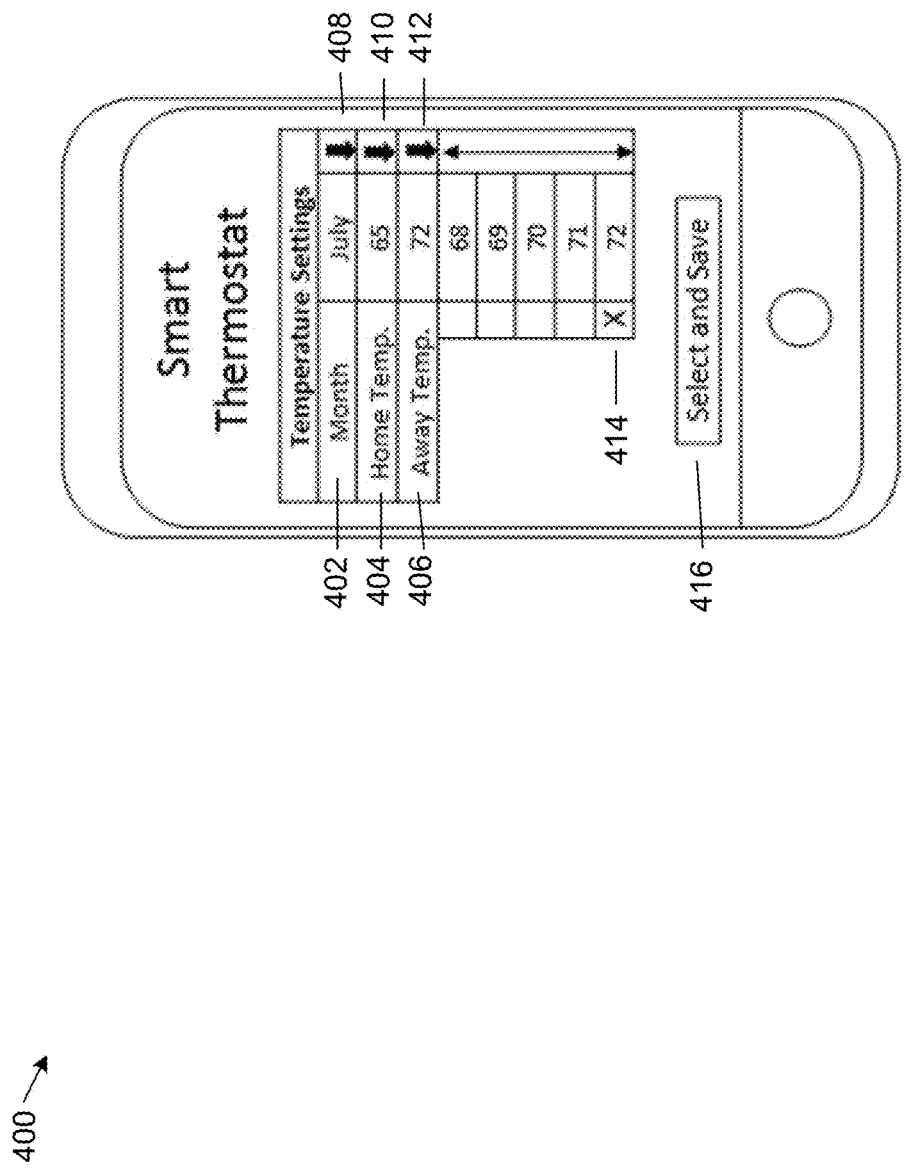
FIG. 4 shows another example user interface of the user device of FIG. 1.

FIG. 4 shows an example user interface 400 of the user device 102. The user interface 400 permits programming temperatures into smart thermostat 106. User interface 400 is displayed when temperature settings 304 are selected on the options 302 user interface screen of FIG. 3.

User interface 400 includes rows for months 402, home temperature 404 and away temperature 406. In order to program smart thermostat 106 temperature for a month 402, a user can select a pull-down list box 408 to select a month. Similarly, home temperature 404 can be selected via pull-down list box 410 and away temperature 406 can be selected via pull-down list box 412. As shown in FIG. 4, smart thermostat 106 is programmed to set a home temperature 404 of 65 and an away temperature 406 of 72 for the month 402 of July. The home temperature 404 corresponds to times that the user is expected to be at home, based on the user's schedule and the away temperature 406 corresponds to times that the user is expected to be away from the home, based on the user's schedule.

When using a pull-down list box on user interface 400 to set a temperature, the user can select a desired temperature by clicking on a box to the left of the temperature. For example, when setting an away temperature 416 of 72, the user can click box 414 to the left of 72. Clicking box 414 causes an "X" to be displayed in box 414 indicating that the temperature of 72 is selected.

The user can continue to set home and away temperatures for additional months of the year. When the user has completed a selection of temperatures, the user can click select and save 416 to save the selected temperatures. When the user clicks select and save 416, the temperatures entered into user interface 400 of the user device 102 are sent to smart thermostat 106 and programmed into smart thermostat 106.

Figure 5:
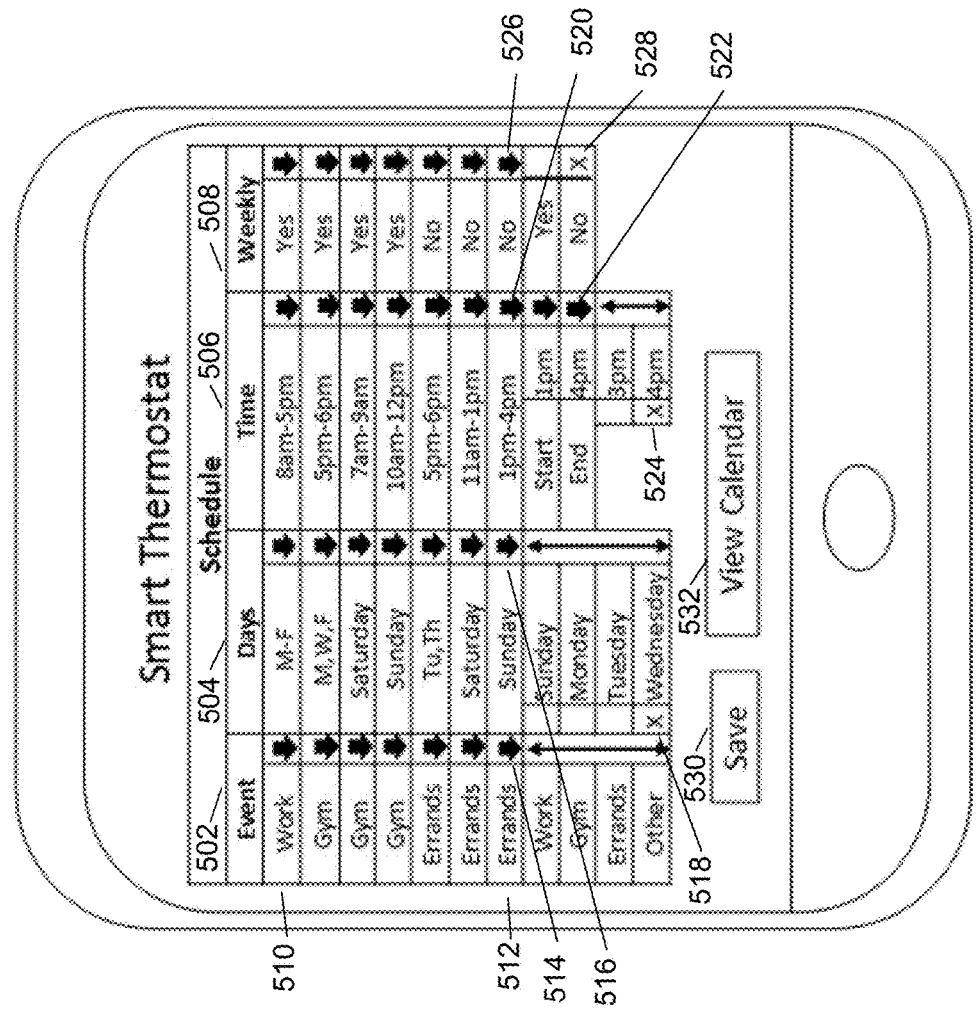
FIG. 5 shows yet another example user interface of the user device of FIG. 1.

FIG. 5 shows an example user interface 500 of the user device 102. The user interface 500 permits entering the user's schedule into the user device 102. User interface 500 is displayed when schedule 306 is selected on the options 302 user interface screen of FIG. 3.

User interface 500 includes rows and columns for entering a user's schedule. The user interface 500 includes columns for event 502, days 504, time 506 and weekly 508. The column for event 502 permits the user to select an event such as work, gym, errands or other. The column for days 504 permits the user to select one or a combination of days corresponding to the event selected in column 502. The column for time 506 permits the user to select a range of hours corresponding to the event selected in column 502. The column for weekly 508 permits the user to select whether the event selected in column 502 occurs on a weekly basis. As an example, for row 510 of the user interface 500, the event work is programmed to occur Monday through Friday from 8 am-5 pm on a weekly basis.

The user interface 500 permits fields to be selected via pull-down list boxes, indicated by the down arrows to the right of each field in each column. For example, for row 512 of the user interface 500, when pull-down list box 514 is selected, a choice of work, gym, errands or other is displayed as available events. When pull-down list box 516 is selected, a choice of days of the week is displayed. A day can be selected by clicking a box to the left of a day. When a box is selected, an "X" is displayed in the box, as shown by clicking box 518 to select Wednesday. When pull-down list box 520 is selected, start and end times for the event can be selected. As shown in FIG. 5, when pull-down list box 522 is selected for an end time, a list of available end times is displayed. An end time can be selected by clicking a box to the left of the time, as shown for box 524. Similarly, a pull-down list box 526 permits a selection of Yes or No for the weekly column 508, as shown in pull-down list box 522.

The user interface 500 also includes a save button 530 and a view calendar button 532. Clicking on the save button 530 permits saving the schedule. Clicking on the view calendar button 523 displays a calendar that can help the user enter scheduling information.

Figure 6:
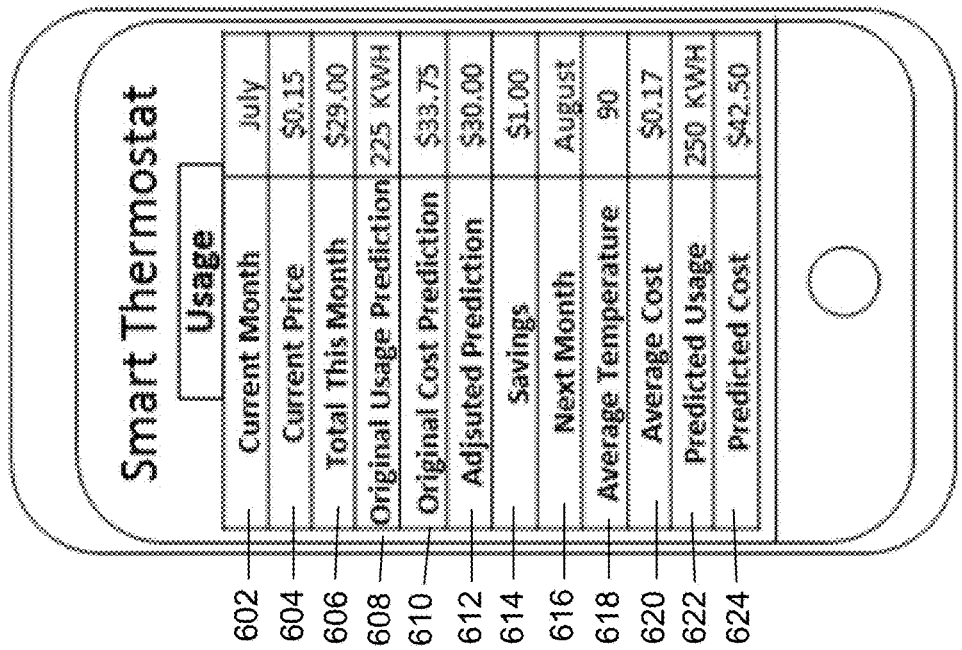
FIG. 6 shows yet another example user interface of the user device of FIG. 1.

FIG. 6 shows an example user interface 600 of the user device 102. The user interface 600 displays energy usage and energy costs for the home. User interface 600 is displayed when usage 308 is selected on the options 302 user interface screen of FIG. 3.

User interface 600 includes rows providing example information regarding energy use for the customer's home. The current month 602 identifies a current month for which information is being provided. For this example, the current month 602 is July. The current price 604 displays a current price of a kilowatt hours of energy. For this example, the current price 604 is $0.15 per kilowatt hour. The total this month 606 displays a total expenditure for energy for the current month. For this example, the total this month 606 is $29.00. The original usage prediction 608 displays a prediction of a number of kilowatt hours of energy predicted to be used in the current month. For this example, the original usage prediction 608 is 225 kilowatt hours. The original cost prediction 610 displays a prediction of a cost of energy to be used in the current month. For this example, the original cost prediction 610 is $33.75. The adjusted prediction 612 is an updated prediction of the cost of energy to be used in the current month. For this example, the adjusted prediction is $30.00. The savings 614 displays a difference between the adjusted prediction 612 and the total this month 606. For this example, the savings 614 is $1.00 ($30.00–$29.00). The next month 616 identifies the month following the current month 602. For this example, the next month 616 is August. The average temperature 618 displays an average temperature for the next month 616. For this example, the average temperature for August is 90 degrees Fahrenheit. The average cost 620 displays an average cost of energy in kilowatt hours for the next month 616. For this example, the average cost of energy for August is $0.17 per kilowatt hour. The predicted usage 622 displays a predicted energy usage for the next month 616. For this example, the predicted usage 622 is 250 kilowatt hours. The predicted cost 624 displays a predicted cost of energy for the home for the next month 616. For this example, the predicted cost 624 is $42.50.

Figure 7:
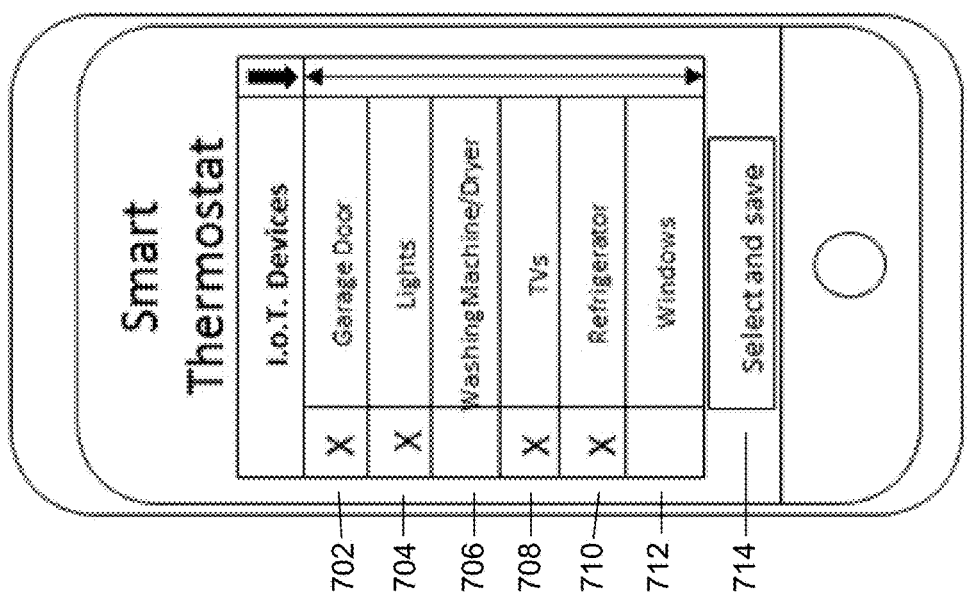
FIG. 7 shows yet another example user interface of the user device of FIG. 1.

FIG. 7 shows an example user interface 700 of the user device 102. The user interface 700 displays and permits a selection of available connected internet of things (I.o.T) devices. User interface 700 is displayed when connected I.o.T devices 310 are selected on the options 302 user interface screen of FIG. 3.

User interface 700 includes a row for each available connected device. Each device is capable of being connected to and controlled over the Internet. Row 702 permits a selection of a garage door, row 704 permits a selection of lights, row 706 permits a selection of a washing machine/dryer, row 708 permits a selection of TVs, row 710 permits a selection of a refrigerator and row 712 permits a selection of windows. A checkbox appears to the left of each device name on each row. When the user clicks the checkbox an "X" appears in the checkbox, indicating that the device is selected. The user can then click select and save 714 to save any selections made.

The selected devices can have an effect on heating and cooling the home. For example, opening or closing a garage door or a window or turning on the lights can affect a heating or cooling of the home, depending on the season. In addition, turning on or off a washing machine, dryer or television or adjusting a setting on a refrigerator can affect energy use in the home.

Figure 8:
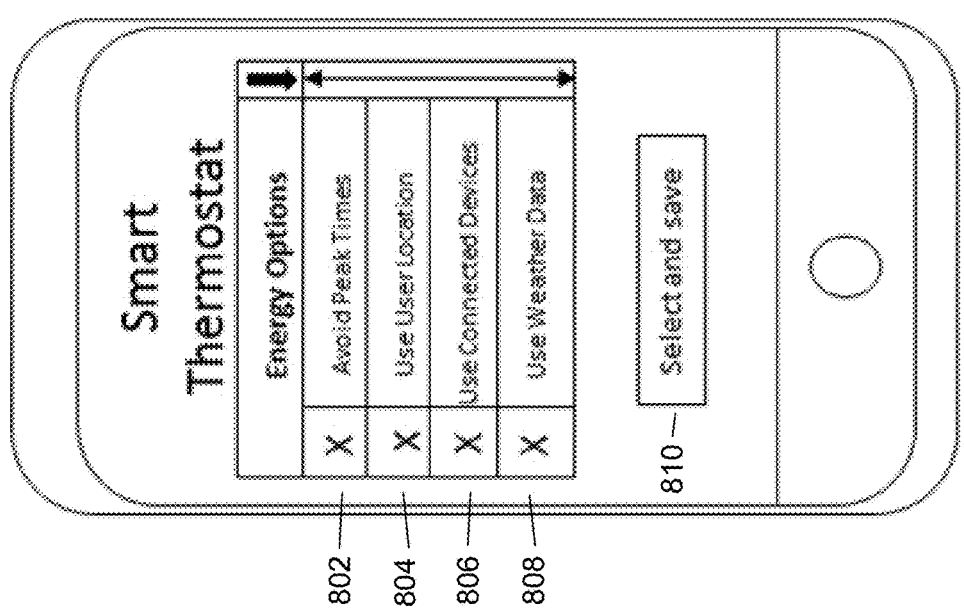
FIG. 8 shows yet another example user interface of the user device of FIG. 1.

FIG. 8 shows an example user interface 800 of the user device 102. The user interface 800 displays and permits a selection of available energy options for the smart thermostat 106. User interface 800 is displayed when energy 312 is selected on the options 302 user interface screen of FIG. 3.

User interface 800 includes rows that display available energy options. Row 802 permits a selection of an option to avoid peak times, row 804 permits a selection of an option to use a user location, row 806 permits a selection of using connected devices and row 808 permits a selection of using weather data. A checkbox appears to the left of each energy option on each row. When the user clicks the checkbox an "X" appears in the checkbox, indicating that the energy option is selected. The user can then click select and save 810 to save any selections made.

The option to avoid peak times directs the smart thermostat 116 to avoid activating heating or cooling during peak energy hours when the cost of energy is high. The option to use user location permits the smart thermostat to obtain GPS information regarding a user's current location. The option to use connected devices permits the smart thermostat 116 to use the selected connected devices of FIG. 7 in addition to or in lieu of the HFAC system to heat or cool the home. The option to use weather data permits the smart thermostat 116 to use obtained weather data to help determine when to heat or cool the home.

Figure 9:
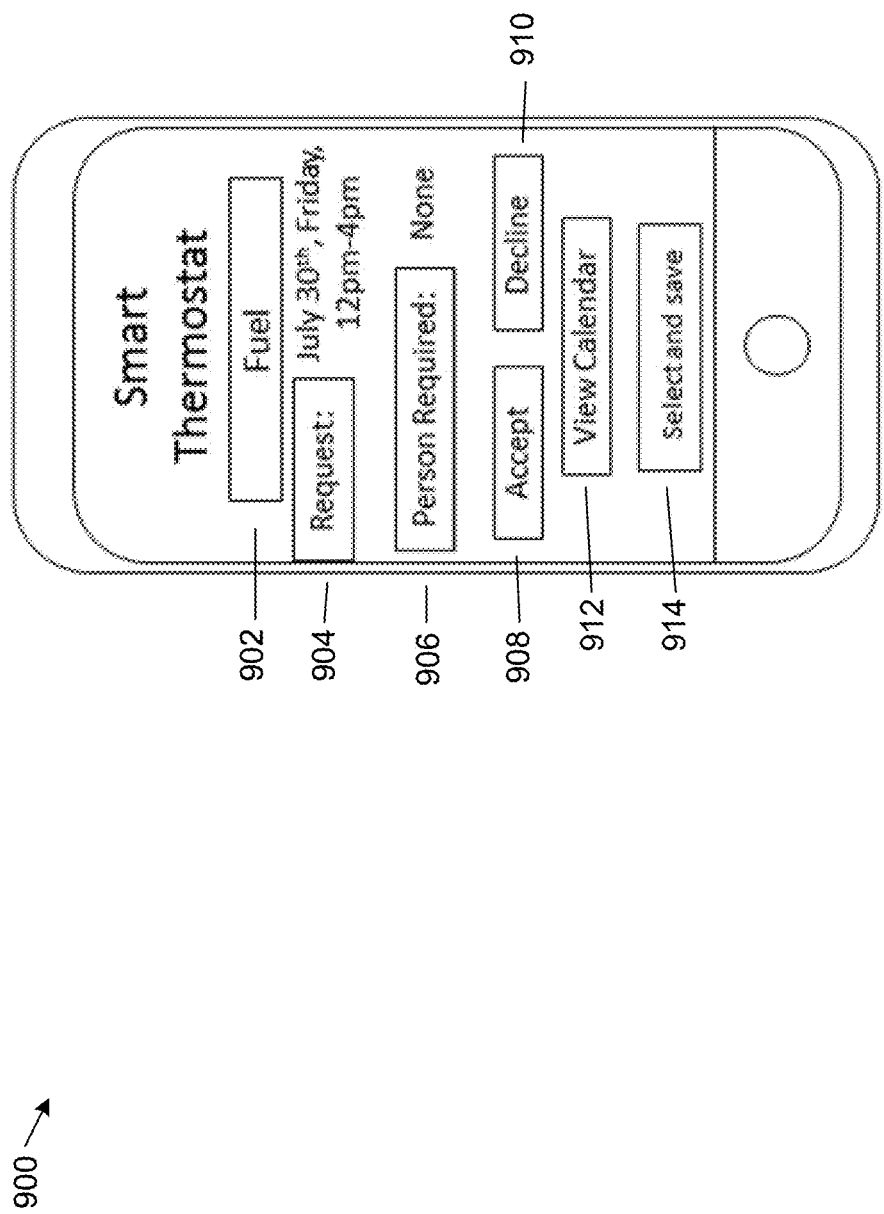
FIG. 9 shows yet another example user interface of the user device of FIG. 1.

FIG. 9 shows an example user interface 900 of the user device 102. The user interface 900 permits a scheduling of a fuel delivery for the home. User interface 900 is displayed when fuel 314 is selected on the options 302 user interface screen of FIG. 3.

User interface 900 permits a scheduling of fuel 902. A request 904 for a fuel delivery can be entered. For this example, the request is for a delivery on Friday, July 30$^{th}$ between 12 pm and 4 pm. A person required 906 to be home can be selected. In this example, none indicates that a person is not required to be home for the fuel delivery. The user interface 900 also includes buttons to accept 908 or decline 910 the fuel delivery. The view calendar 912 button permits a display of a calendar to help the user select dates for the fuel delivery. The select and save 914 button permits the user to select and save entries made on user interface 900.

Figure 10:
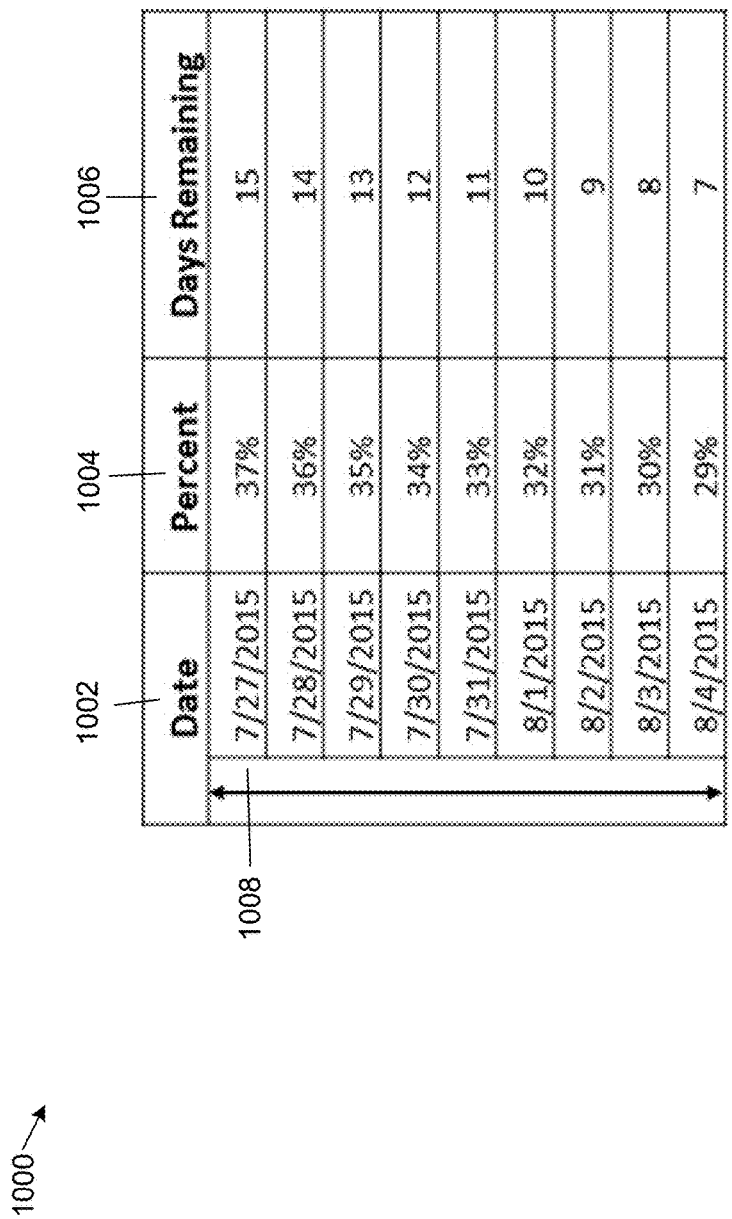
FIG. 10 shows an example smart thermostat fuel status database structure.

FIG. 10 shows an example smart thermostat fuel status database structure 1000. The fuel status database structure 1000 has columns for date 1002, percent 1004 and days remaining 1006. The column for date 1002 indicates dates of the year. The column for percent 1004 indicates a percent of fuel remaining in the home for each of the dates 1002 of the year. The column for days remaining 1006 indicates a number of days of fuel remaining for each of the dates 1002 of the year. For example, row 1008 shows that for Jul. 27, 2015, 37% of fuel in a fuel tank for the home is remaining and this corresponds to 15 days of available fuel for the home.

Figure 11:
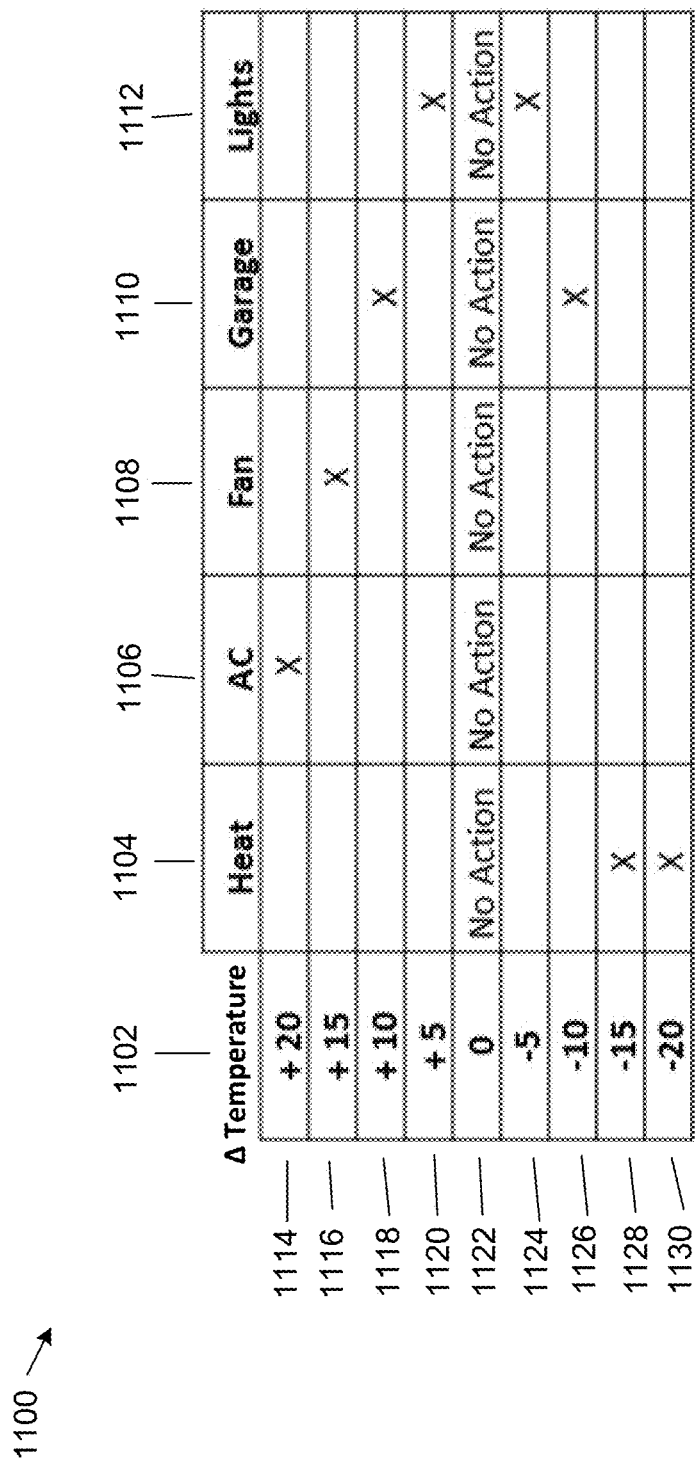
FIG. 11 shows an example smart thermostat device database structure.

FIG. 11 shows an example smart thermostat device database structure 1100. The device database structure 1100 indicates a device that should be used to heat or cool the home based on a temperature deviation between a current temperature in the home and a preference temperature for the home that is programmed into the smart thermostat 106. The device database structure 1100 includes columns for a deviation in temperature between the current temperature and the preference (A temperature 1102) and energy devices for heat 1104 (for example a furnace), air conditioning 1106, fan 1108, garage 1110 and lights 1112. More, fewer or different energy devices can be used.

The device database structure 1100 indicates that for a given A temperature 1102, a specific energy device should be used to heat or cool the home to the preference temperature at optimal energy cost. For example, row 1114 shows that when the current temperature inside the home is 20 degrees Fahrenheit greater than the preference temperature, an air conditioner should be turned on. Row 1116 shows when the current temperature is 15 degrees Fahrenheit higher than the preference temperature, a fan should be turned on. Row 1118 shows that when the current temperature is 10 degrees Fahrenheit higher than the preference temperature, a garage door should be used (the garage door can be opened to cool the home). Row 1120 shows that when the current temperature is 5 degrees Fahrenheit higher than the preference temperature, lights can be used (the lights can be turned off to cool the home). Row 1122 shows that when the current temperature and the preference temperature are the same, no action should be taken. Row 1124 shows that when the current temperature is 5 degrees Fahrenheit lower than the preference temperature, the lights can be used (the lights can be turned on to heat the home). Row 1126 shows that when the current temperature is 10 degrees Fahrenheit lower than the preference temperature, the garage door can be used (the garage door can be closed to heat the home). Row 1128 shows that when the current temperature is 15 degrees Fahrenheit lower than the preference temperature, the furnace should be turned on. Row 1130 shows that when the current temperature is 20 degrees Fahrenheit lower than the preference temperature, the furnace should also be turned on.

FIG. 12 shows an example smart thermostat usage database 1200. The usage database indicates a percentage of time at which a device should be operated based on a time of peak hours and a time of non-peak hours. A time of peak hours is typically a time of a day when energy usage is highest in a geographical area.

The usage database 1200 includes columns for device 1202, peak hours 1204 and non-peak hours. Row 1208 shows that for a device that provides heat (for example a furnace), the furnace should be operated at 25% during peak hours and 100% during non-peak hours. Row 1210 shows that an air conditioner should be operated at 25% during peak hours and 100% during non-peak hours. Row 1212 shows that a fan should be operated at 30% during peak hours and 100% during non-peak hours. Row 1214 shows that a garage door should be opened or closed during both peak hours and non-peak hours. Row 1216 shows that lights should be operated at 50% during peak hours and 100% during non-peak hours.

Figure 13:
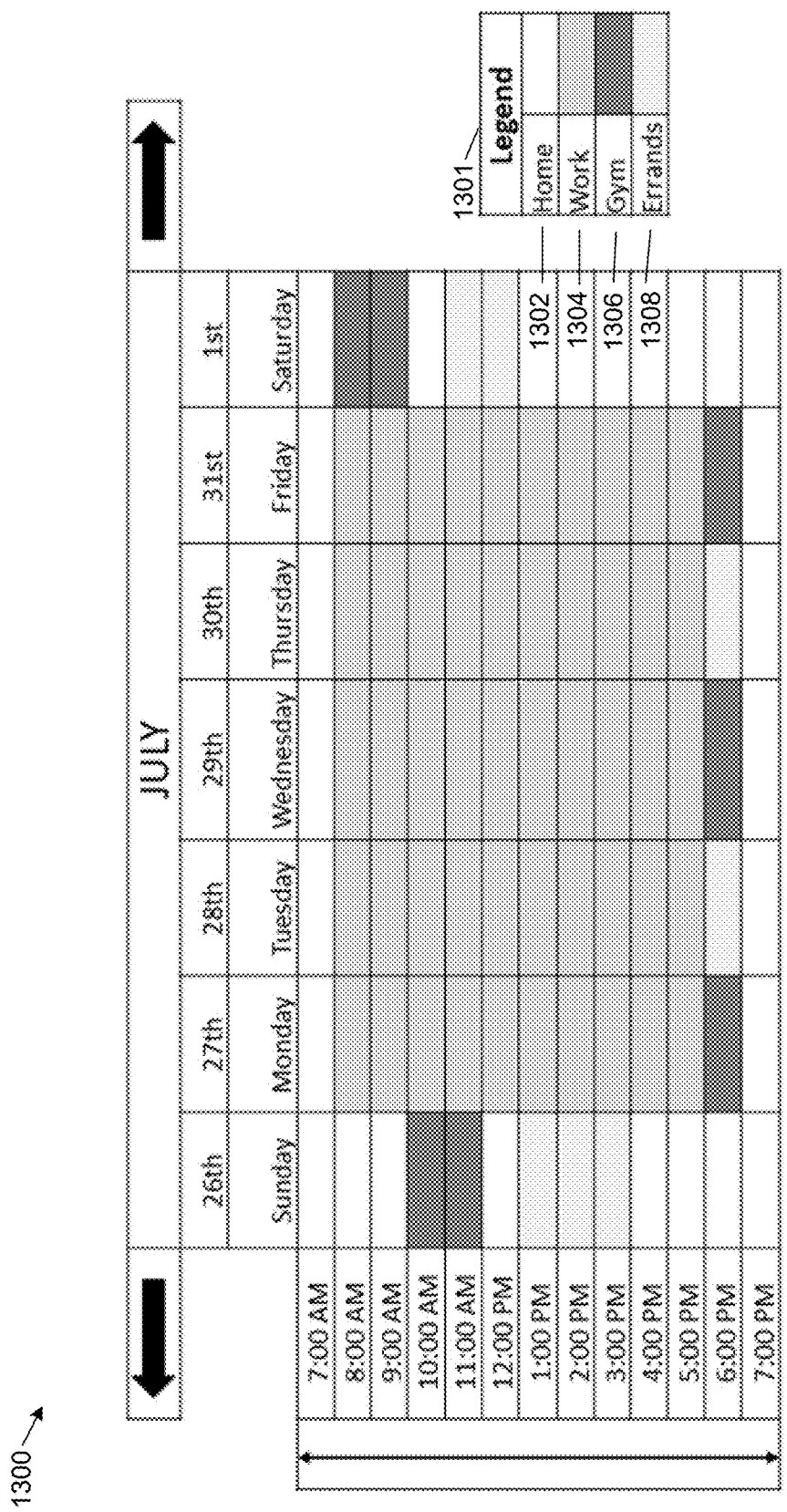
FIG. 13 shows an example schedule database structure.

FIG. 13 shows an example schedule database structure 1300 for a user device 102. The schedule database structure can be displayed in a calendar view on a user interface of the user device 102. The calendar view displays times at one hour intervals and shows user activities during those one hour intervals during days of a week. The user activities are displayed according to a legend 1301. The legend 1301 indicates specific shadings on the calendar view for when the user is home 1302, the user is at work 1304, the user is at a gym 1306 and the user is running errands 1308. More, fewer or different user activities can be shown on the calendar view.

FIG. 14 shows an example weather database structure 1400. The weather database structure 1400 is obtained from one of databases 108 and transmitted over network 104 to the smart thermostat 116. The weather database structure 1400 includes columns for dates 1402, times 1404, locations 1406, temperatures 1408, conditions 1410 and chances of precipitation 1412. For example, row 1414 shows that on Jul. 27, 2015 at 9:00 am, at location x,y,z the temperature is predicted to be 70 degrees Fahrenheit, it is expected to be cloudy and the chance of precipitation is expected to be 40%.

Figure 15:
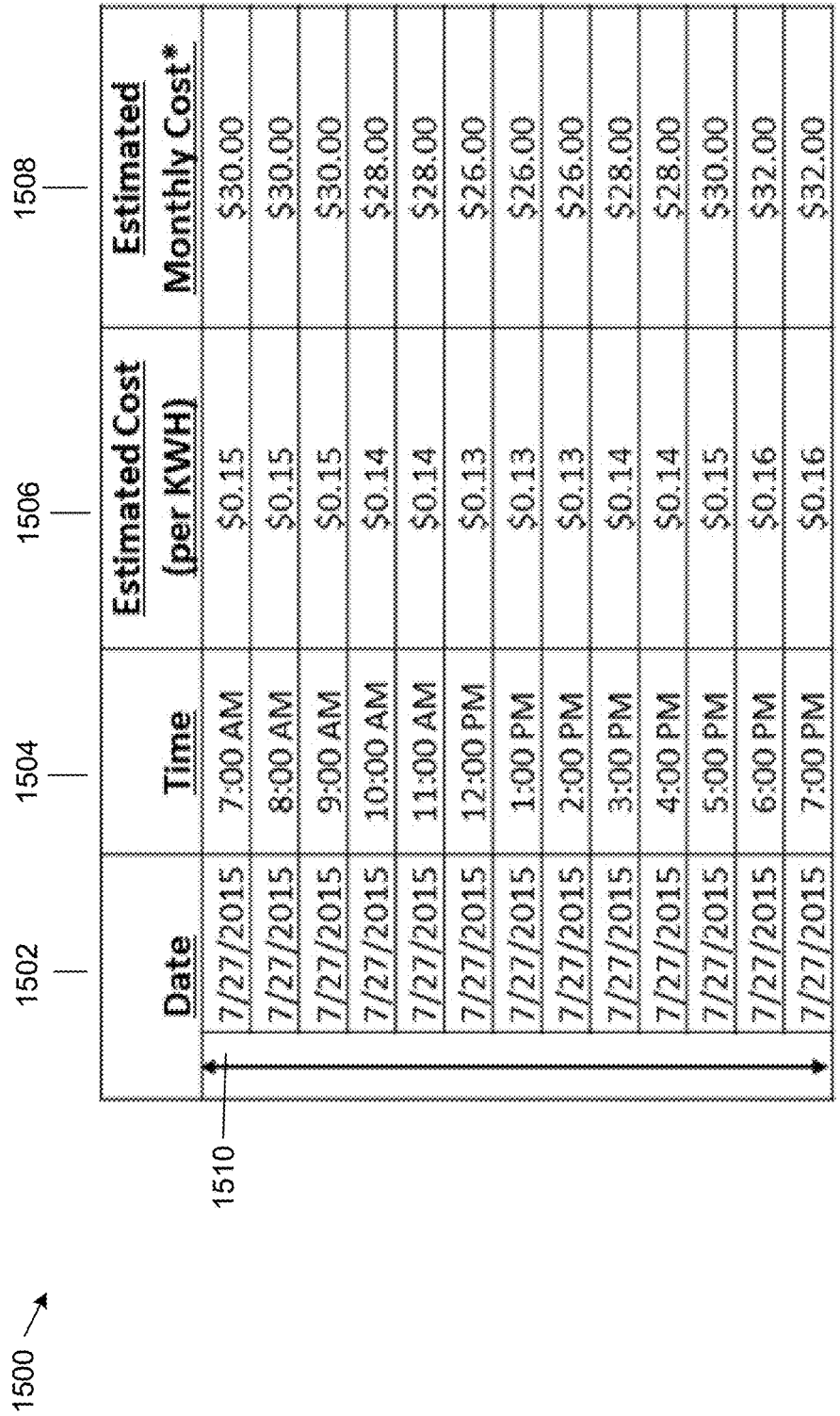
FIG. 15 shows an example external data network utility database structure.

FIG. 15 shows an example utility database structure 1500. The utility database structure 1500 is obtained from one of databases 108 and transmitted over network 104 to the smart thermostat 116. The utility database structure 1500 includes columns for date 1502, time 1504, estimated cost 1506 in kilowatt hours and estimated monthly cost 1508. The date 1502 and time 1504 represent a date and time for which the estimated cost 1506 in kilowatt hours and the estimated monthly cost 1508 apply. The estimated cost 1506 represents an estimated energy cost per kilowatt hour. The estimated monthly cost 1508 represents an estimated energy cost for a 30 day period based on previous kilowatt usage during a current month. For example, if usage for a 15 day period prior to a selected date 1502 and time 1504 is 100 kilowatts, then the estimated usage for the 30 day period would be 200 kilowatts and the estimated monthly cost would be 200 kilowatts multiplied by the estimated monthly cost 1508 for the date 1502 and time 1504. As an example, as shown in row 1510, for a date 1502 of Jul. 27, 2015 and a time 1504 of 7:00 am, the estimated cost 1506 is $0.15 per kilowatt hour. The estimated monthly cost 1508 is $30.00, assuming that the usage for a 15 day period prior to Jul. 27, 2015 is 100 kilowatts. The usage for the 30 day period starting Jul. 27, 2015 is assumed to be 200 kilowatts and the estimated monthly cost 1508 of $30.00 is obtained by multiplying 200 by $0.15.

FIG. 16 shows an example fuel database structure 1600. The fuel database structure 1600 is obtained from one of databases 108 and transmitted over network 104 to the smart thermostat 116. The fuel database structure 1600 includes columns for month 1602, week of 1604, estimated cost 1606, days available 1608 and times available 1610. The month 1602 and week of 1604 correspond to a week of a month for which an estimated cost 1606 of fuel is provided. The days available 1608 indicate the days of the week of 1604 for which the user is available to have fuel delivered. The times available 1610 correspond to hours of the days available 1608 for which the user is available to have fuel delivered. In an example shown for row 1612, for the week of August 2, the user is available for fuel delivery on Wednesday from 12 pm-2 pm and the estimated cost for fuel delivered that week is $300.

Figure 17:
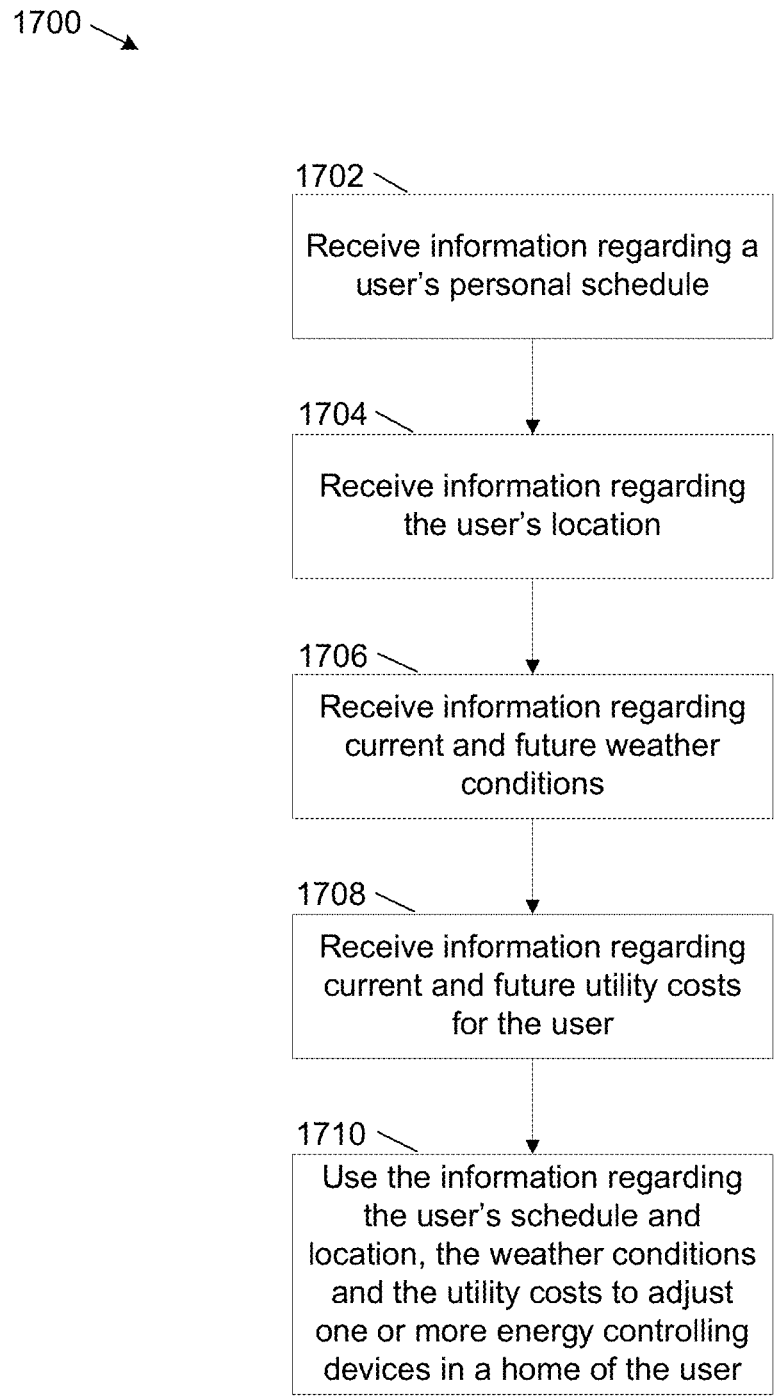
FIG. 17 shows a flowchart of an example method for controlling energy devices in a home based on a user's personal schedule and other information.

FIG. 17 shows a flowchart of an example method 1700 for controlling energy devices in a home based on a user's personal schedule and other information.

At operation 1702, information is received at a smart thermostat regarding a user's personal schedule. The information is compiled on a user device such as a smartphone, tablet computer, laptop computer or desktop computer and sent to the smart thermostat across a network from the user device. The user's personal schedule contains a schedule of activities for the user for a week. Some example user activities can include work, gym and errands. Other activities are possible.

At operation 1704, information is received at the smart thermostat regarding the user's current location. The location information can be obtained via GPS software on the user device.

At operation 1706, information can be received at the smart thermostat regarding current and future weather conditions. The information can be received from an external data network weather database. The external data network weather database can provide predicted weather conditions for a location of the user's home. The predicted weather conditions can include hourly temperature forecasts, a percent chance of precipitation, and a descriptive term of the current weather, for example sunny, cloudy, partly cloudy, rain, snow, etc.

At operation 1708, information is received at the smart thermostat regarding current and future utility costs for the user. The information regarding the utility costs can include an estimated cost per kilowatt hour on an hourly basis and an estimated monthly utility cost.

At operation 1710, the information regarding the user's schedule and location, the weather conditions and the utility costs are used to adjust one or more energy controlling devices for the user's home. The energy controlling devices can include one or more of a HVAC system, a fan, lights, automatic window blinds, lights and a garage door. Other energy controlling devices are possible. As explained in more detail with regard to FIGS. 18-20, the smart thermostat 106 determines from the user's personal schedule and actual location when the user will be home, obtains information regarding temperatures inside and outside the home, determines whether a heating or cooling adjustment needs to be made, selects a connected device with which to actuate the heating or cooling adjustment based on a temperature differential between the temperatures inside and outside the home, and implements the heating or cooling adjustment with the selected connected device.

Figure 18:
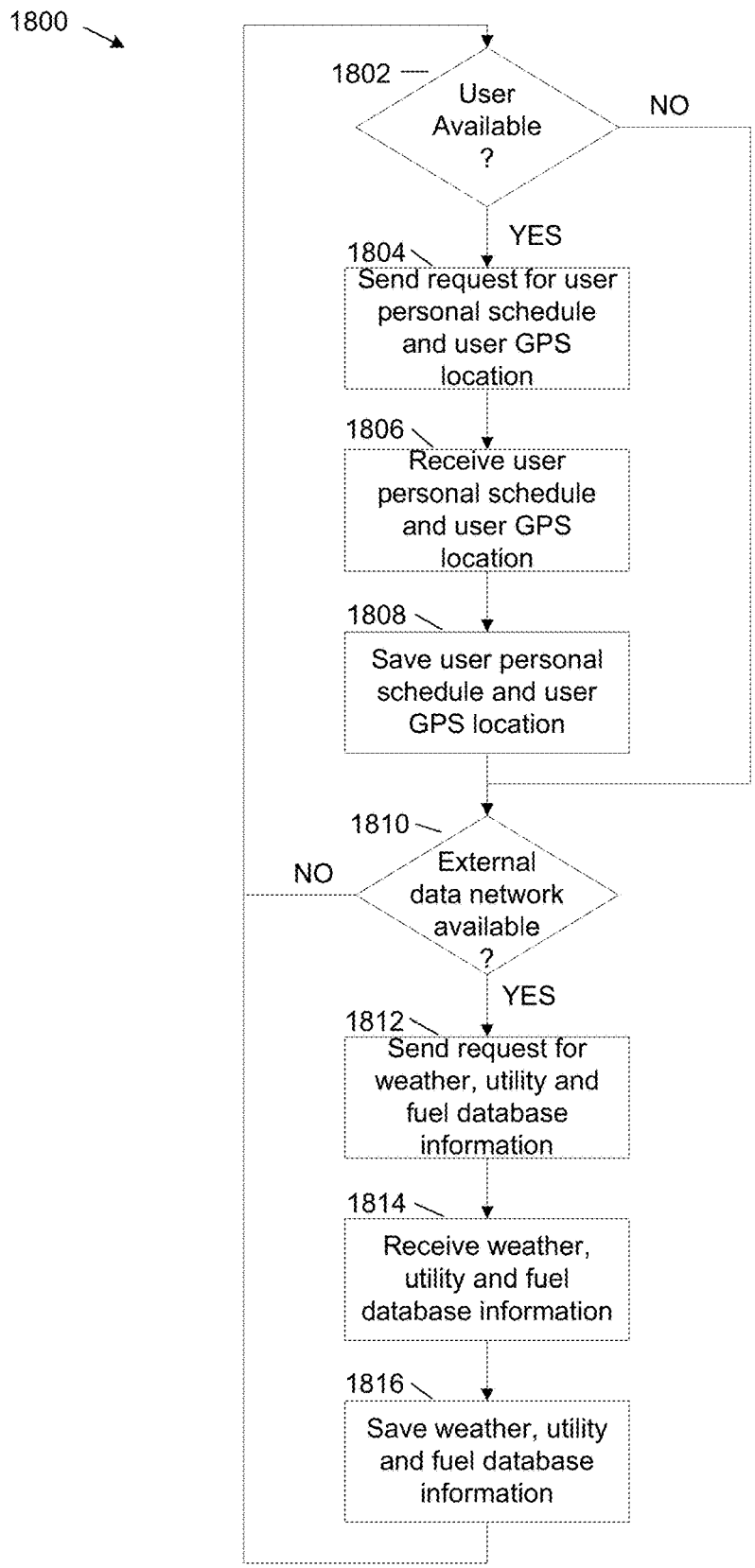
FIG. 18 shows an example method for requesting and obtaining information from some of the databases of FIG. 1.

FIG. 18 shows a flowchart of an example method 1800 for requesting and obtaining information regarding the user's personal schedule, current location and information from weather, utility and fuel databases.

At operation 1802, a determination is made as to whether a user is available. The determination as to whether the user is available can comprise determining whether a user device 102 can be accessed from the smart thermostat 106.

When a determination is made that the user is available, at operation 1804, a request is sent from the smart thermostat 106 to the user device 102 for the user personal schedule and the user GPS location. At operation 1806, the user personal schedule and the GPS location are received at the smart thermostat 106 and at operation 1808, the user personal schedule and the GPS location are saved in the smart thermostat 106. The user personal schedule information is similar to that shown in FIG. 13.

At operation 1802, when the user is not available and also following operation 1808, a determination is made as to whether an external data network is available. When a determination is made that the external data network is not available, control returns to operation 1802.

When a determination is made that the external data network is available, at operation 1812, requests are made for weather, utility and fuel database information. The request for weather information is made to the external data network weather database, the request for utility information is made to the external data network fuel database and the request for fuel information is made to the external data network fuel database.

At operation 1814 the requested weather, utility and fuel database information is received and at operation 1814, the weather, utility and fuel database information is saved in the smart thermostat 106. The weather database information is similar to that shown in FIG. 14, the utility database information is similar to that shown in FIG. 15 and the fuel database information is similar to that shown in FIG. 10.

Figure 19:
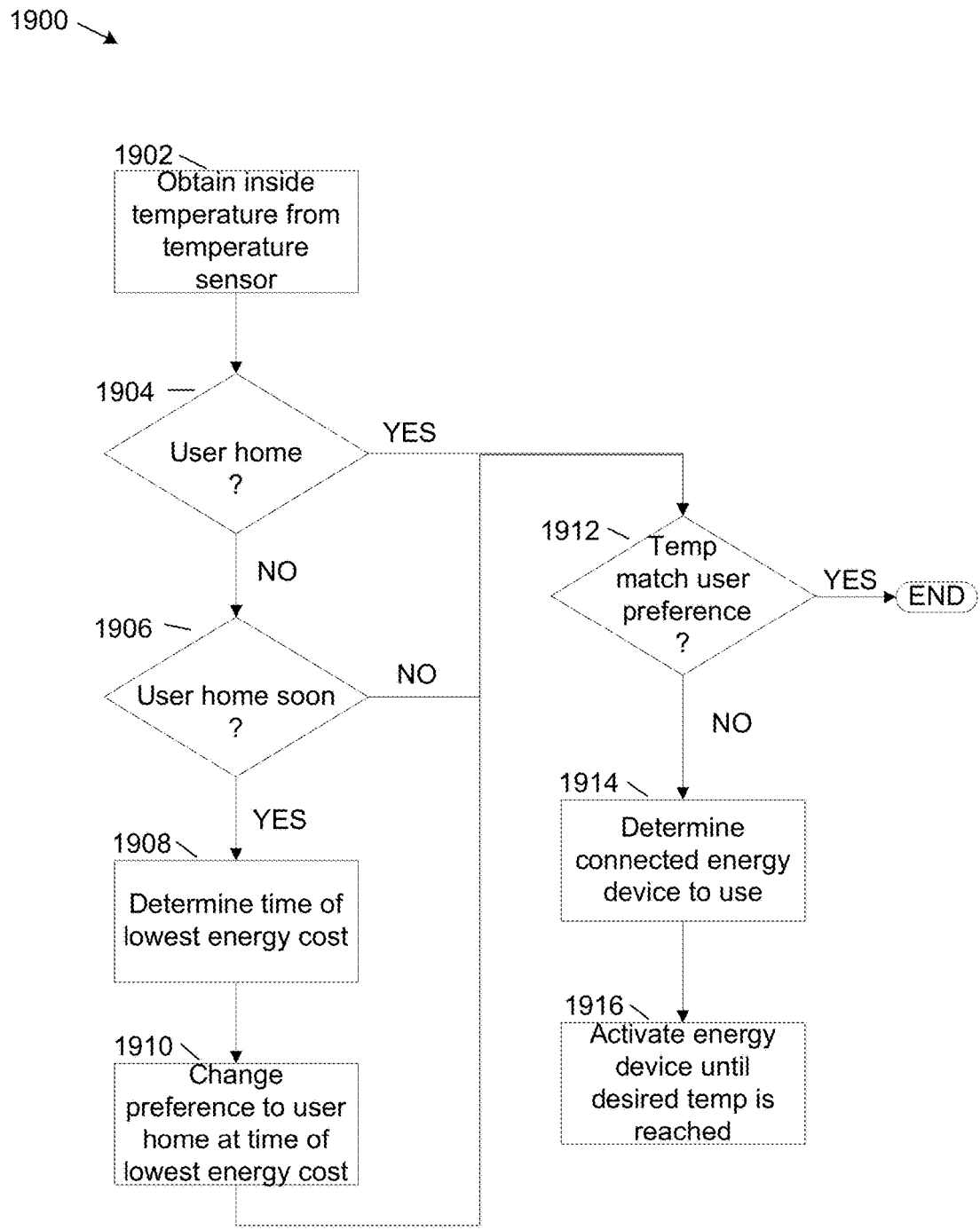
FIG. 19 shows an example method for determining when to heat or cool a home.

FIG. 19 shows a flowchart of an example method 1900 for determining when to heat or cool the home based on the user's personal schedule, the current location of the user and current weather conditions.

At operation 1902, a current temperature inside the home is obtained from a temperature sensor on the smart thermostat 106.

At operation 1904, a determination is made as to whether the user is home. When a determination is made that the user is home, control advances to operation 1912, as described later herein.

When a determination is made that the user is not at home, at operation 1906 a determination is made as to whether the user will be home soon, for example within the next three hours. Other time intervals corresponding to the user being home soon can be used. The determination is made by accessing the user's personal schedule that was downloaded to the smart thermostat 106 and by obtaining the user's current location from GPS information.

When a determination is made that the user will not be home soon, an energy preference at the smart thermostat remains as user away from home. Control then advances to operation 1912.

When a determination is made that the user will be home soon, at operation 1908, a time of lowest energy cost is determined. The time of lowest energy cost can be determined from the utility database (see FIG. 15). Then, at operation 1910, at a time of the lowest energy cost, the energy preference at the smart thermostat is changed to user at home.

At operation 1912, a determination is made as to whether the inside temperature matches a user preference temperature. That is, does the current inside temperature match a temperature programmed into the smart thermostat for a preference of user at home? When a determination is made that there is a match, no further action needs to be taken.

At operation 1914, when a determination is made that there is not a match between the inside temperature and the user preference temperature, at operation 1920, a determination is made as to which connected device to use to heat or cool the home. The determination as to which connected device to use can be made by using the device database (see FIG. 11). The determination as to which connected device to use is made by determining a deviation between the current inside temperature and the user preference temperature, as explained earlier herein with regard to FIG. 11.

At operation 1916, the connected device selected at operation 1914 is activated to heat or cool the home until a desired temperature is reached. Activating the selected device to heat or cool the home until the desired temperature is reached comprises extracting peak times from the network utility database, comparing the selected connected device to the smart thermostat 106 usage database, extracting a percentage of usage from the usage database (per FIG. 1200) and applying appropriate algorithms to determine an efficient way to reach the user preference temperature. In some implementations, the algorithms can be downloaded from one of databases 108. In other implementations the algorithms are included on smart thermostat 106 as part of an installed software package for smart thermostat 106.

Over a period of time, the smart thermostat 106 learns thermal load curves (how long it takes to heat/cool a home based on a connected device that is used), and based on the user's personal schedule can more efficiently arrive at a user set temperature. For example, if the home is currently at 65 degrees Fahrenheit and needs to get to 75 degrees and the current outside temperature is 20 degrees and the home has to reach 75 degrees within 3 hours, the smart thermostat 106 can take one hour to heat the home by 10 degrees in those weather conditions. The smart thermostat 106 knows the peak times and will heat the home over the cheapest hour and maintain that temperature during peak hours in order to save the user money based on utility usage.

Figure 20:
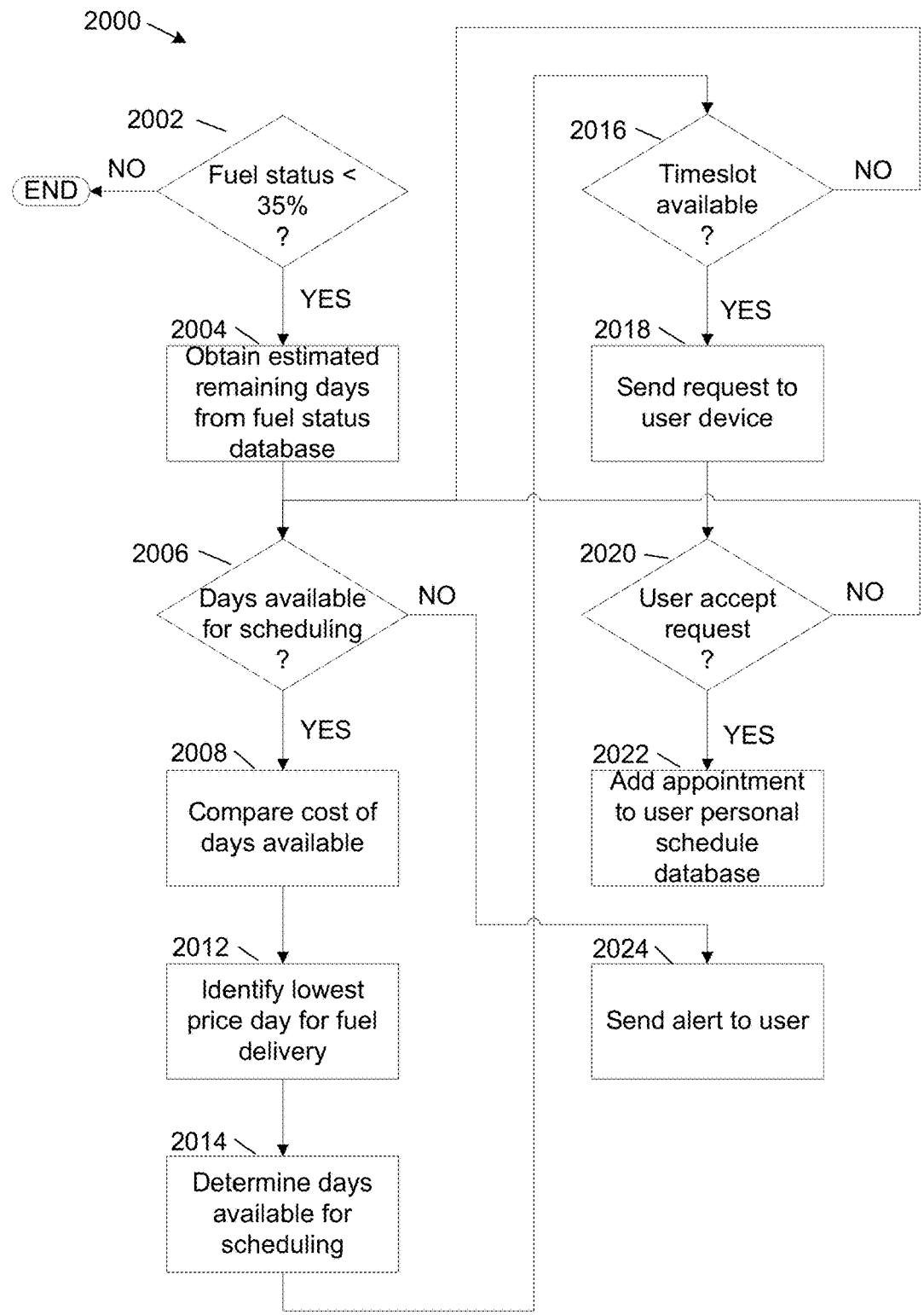
FIG. 20 shows an example method for scheduling a fuel delivery.

FIG. 20 shows a flowchart of an example method 2000 for scheduling a fuel delivery. For the example method 2000, the fuel delivery is for heating oil.

At operation 2002, a determination is made as to a percentage of heating oil in a fuel tank for the home that is available for heating the home. The percentage can be calculated by determining an amount of heating oil that has been used since the fuel tank was filled and dividing by a capacity of the fuel tank.

At operation 2004 an estimated number of remaining days to heat the home is obtained from the fuel status database. The fuel database shown in FIG. 10 includes columns that correlate a percent of fuel available in the fuel tank with a number of days of fuel remaining in the fuel tank. For example, a percent of 37% correlates to 15 days remaining as of Jul. 27, 2015.

At operation 2006 a determination is made as to whether there are days available to schedule a fuel delivery before the fuel tank is empty. The number of days available can be determined from the day's available 1608 of the fuel database shown in FIG. 16. For example, there aren't any days available for a fuel delivery during the week of July 26 and during the next week of August 2, only Wednesday is available. When there aren't any days available for a fuel delivery before the fuel tank becomes empty, based on the number of days remaining in the fuel tank and the number of days available from the fuel database, at operation 2024 an alert is sent to the user.

When a determination is made that there are days available for scheduling, at operation 2008 a comparison is made of the cost of a fuel delivery for the days on which a fuel delivery is available. For example, the fuel database of FIG. 16 shows that for fuel delivered the week of August 2, the estimated cost is $300, for fuel delivered the week of August 9, the estimated cost is $350 and for fuel delivered the weeks of August 30, September 6 and September 13, the estimated cost of the fuel delivery is $450.

At operation 2012, a lowest price day is identified for fuel delivery. For example, from FIG. 16, the lowest price day that is available is Wednesday of the week of August 2. On that day fuel can be delivered for $300.

At operation 2014, the days available for scheduling are determined from the fuel database. For example, FIG. 16 shows that no days are available the week of July 2 and only Wednesday is available the week of August 2.

At operation 2016 a determination is made as to whether a timeslot is available. The time slot can be obtained from the times available column in the fuel database shown in FIG. 16. When a determination is made that no timeslot is available, control returns to operation 2006 and the days available for scheduling is revisited.

When a determination is made that a time slot is available, at operation 2018, a request to schedule a fuel delivery for the available day and timeslot is sent to the user.

At operation 2020, a determination is made as to whether the user accepts the request. When the user does not accept the request, control returns to operation 2006 and the days available for scheduling is revisited. When the user does accept the request, at operation 2022, an appointment for a fuel delivery is added to the user personal schedule database.

The systems and methods can be used for other applications besides controlling temperature effecting devices based on a user's schedule and preferences. For example, downloadable templates can be provided for the user such as a winter template, a vacation template, etc. in which temperature can be adjusted for the user regardless of their schedule, preference, etc. As another example, the smart thermostat 106 can provide cost savings suggestions from alternative energy sources, such as informing the user that the user can save a certain amount of money by installing a solar panel on the roof of the user's home. In yet another example, the user can control a temperature effecting device or an energy effecting device from a user device such a smartphone and have an updated cost sent to a GUI on the user device based on usage of the temperature effecting device or energy effecting device. In yet another example, the user can issue a payment method into the GUI on the user device to withdraw funds from an account at a financial institution or show funds already withdrawn from the account to assist in financial planning. In yet another example, the smart thermostat 10 can send alerts to the user if a temperature in the home is manually adjusted or if a temperature effecting device or an energy effecting device is altered. Still other examples are possible.

Figure 21:
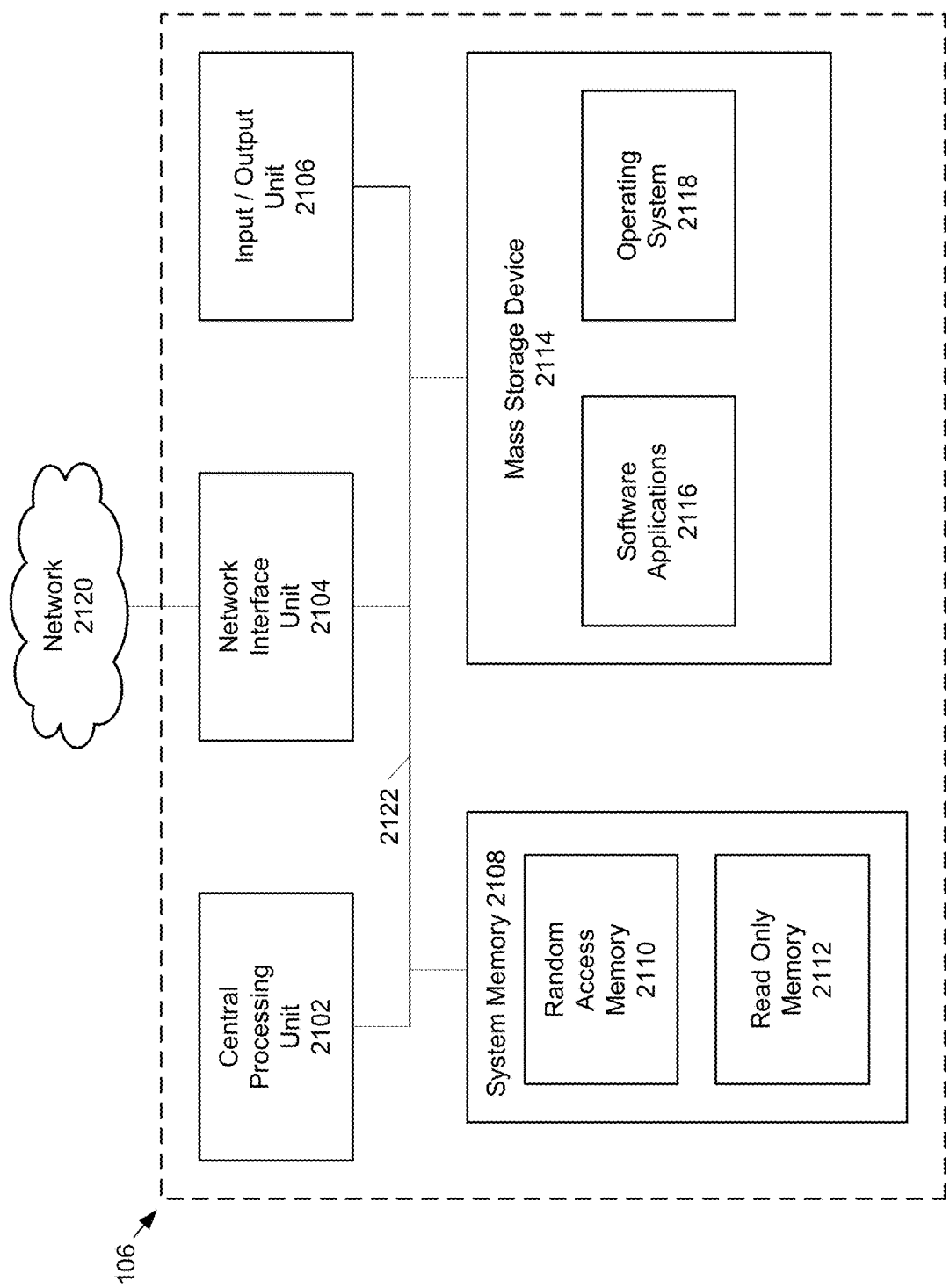
FIG. 21 shows example physical components of the smart thermostat of FIG. 1.

As illustrated in the example of FIG. 21, smart thermostat 106 includes at least one central processing unit ("CPU") 2102, a system memory 2108, and a system bus 2122 that couples the system memory 2108 to the CPU 2102. The system memory 2108 includes a random access memory ("RAM") 2110 and a read-only memory ("ROM") 2112. A basic input/output system that contains the basic routines that help to transfer information between elements within the smart thermostat 106, such as during startup, is stored in the ROM 2112. The smart thermostat 106 further includes a mass storage device 2114. The mass storage device 2114 is able to store software instructions and data.

The mass storage device 2114 is connected to the CPU 2102 through a mass storage controller (not shown) connected to the system bus 2122. The mass storage device 2114 and its associated computer-readable data storage media provide non-volatile, non-transitory storage for the smart thermostat 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the smart thermostat 106.

According to various embodiments of the invention, the smart thermostat 106 may operate in a networked environment using logical connections to remote network devices through the network 2120, such as a wireless network, the Internet, or another type of network. The smart thermostat 106 may connect to the network 2120 through a network interface unit 2104 connected to the system bus 2122. It should be appreciated that the network interface unit 2104 may also be utilized to connect to other types of networks and remote computing systems. The smart thermostat 106 also includes an input/output controller 2106 for receiving and processing input from a number of other devices, including a touch user interface display screen, or another type of input device. Similarly, the input/output controller 2106 may provide output to a touch user interface display screen or other type of output device.

As mentioned briefly above, the mass storage device 2114 and the RAM 2110 of the smart thermostat 106 can store software instructions and data. The software instructions include an operating system 2118 suitable for controlling the operation of the smart thermostat 106. The mass storage device 2114 and/or the RAM 2110 also store software instructions, that when executed by the CPU 2102, cause the smart thermostat 106 to provide the functionality of the smart thermostat 106 discussed in this document. For example, the mass storage device 2114 and/or the RAM 2110 can store software instructions that, when executed by the CPU 2102, cause the smart thermostat 106 to display received data on the display screen of the smart thermostat 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for controlling a temperature of a home, the method comprising:
    on the electronic computing device, receiving information regarding a user's personal schedule;
    receiving information regarding the user's location;
    receiving information regarding current and future utility costs;
    using the information regarding the user's personal schedule, the information regarding the user's location and the information regarding the current and future utility costs to determine at least one financial impact based on a temperature setting, wherein the at least one financial impact includes estimated costs for time intervals and historical billing cycles;
    controlling a temperature effecting device or an energy effecting device in the home of the user using the at least one financial impact; and
    using the financial impact regarding billing cycles to determine a percentage usage for the temperature effecting device during peak hours and non-peak hours.

2. The method of claim 1, further comprising using the financial impact regarding estimated costs for time intervals to determine a least costly time to adjust a temperature of the home.

3. The method of claim 1, wherein the temperature effecting devices are accessible to the electronic computing device over the Internet.

4. The method of claim 1, wherein the electronic computing device can adjust operation of a furnace, an air conditioner, a garage door, electric lights, window blinds, a washing machine, a dryer and a refrigerator.

5. The method of claim 1, further comprising sending data to a user device regarding energy usage for the home.

6. The method of claim 5, wherein the data regarding energy usage for the home includes an energy usage prediction for a current month and an adjustment to the energy usage prediction for the current month, the adjustment to the energy usage prediction being based on current and future weather conditions and the user's personal schedule.

7. A method implemented on an electronic computing device for controlling a temperature of a home, the method comprising:
    on the electronic computing device, receiving information regarding a user's personal schedule;
    receiving information regarding the user's location;
    receiving information regarding current and future utility costs;
    using the information regarding the user's personal schedule, the information regarding the user's location and the information regarding the current and future utility costs to determine at least one financial impact based on a temperature setting, wherein the at least one financial impact includes estimated costs for time intervals and historical billing cycles;
    controlling a temperature effecting device or an energy effecting device in the home of the user using the at least one financial impact; and
    sending data to a user device regarding energy options for the electronic computing device, wherein the energy options include a combination of avoiding peak hours, using a user location, using connected devices and using weather data.

8. The method of claim 1, further comprising receiving from a user device one or more selections of the permissible temperature effecting devices to use when controlling the temperature of the home.

9. The method of claim 1, further comprising:
    determining a time of a day at which the temperature of the home is to be adjusted;
    determining whether the time of the day is a peak hour for energy use;
    determining a temperature effecting device to use;
    determining a percent of time that the temperature effecting device can be run during the time of the day corresponding to the peak hour; and
    activating the temperature effecting device only for the percent of time that the temperature effecting device can be run during the time of the day corresponding to the peak hour.

10. The method of claim 1, further comprising:
    determining a status of fuel in a fuel tank for the home, the status of the fuel representing a percentage of fuel remaining in the fuel tank; and
    sending the status of the fuel to a user device.

11. The method of claim 1, further comprising:
determining a number of days remaining before a fuel delivery needs to be scheduled;
determining estimated costs of fuel for the number of days; and
sending a request to the user device regarding scheduling a fuel delivery for the home, the request being to schedule the fuel delivery for a specific day and time within the number of days remaining when the estimated costs of fuel is lowest.

12. The method of claim 1, further comprising:
using the user's personal schedule and the user's current location to determine a time at which the user will arrive home;
determining a time of a lowest energy cost between a current time and the time when the user will arrive home;
select a temperature effecting device to use; and
activate the temperature effecting device during the time of the lowest energy cost.

13. A smart thermostat, comprising:
a processing unit; and
system memory, the system memory including instructions which, when executed by the processing unit, cause the smart thermostat to:
receive information regarding a user's personal schedule;
receive information regarding the user's location;
receive information regarding current and future weather conditions;
receive information regarding current and future utility costs for the user;
use the information regarding the user's personal schedule, the information regarding the user's location, the information regarding the current and future weather conditions and the information regarding the current and future utility costs to control one or more temperature effecting devices for the user;
determine a number of days remaining before a fuel delivery needs to be scheduled;
determine estimated costs of fuel for the number of days; and
send a request to the user device regarding scheduling a fuel delivery for the home, the request being to schedule the fuel delivery for a specific day and time within the number of days remaining when the estimated costs of fuel is lowest.

14. The smart thermostat of claim 13, wherein the smart thermostat can control operation of a furnace, an air conditioner, a garage door, electric lights, windows, a washing machine, a dryer and a refrigerator.

15. The smart thermostat of claim 13, wherein the instructions further cause the smart thermostat to determine a lowest cost of energy during a time in which a temperature of the home is to be adjusted and to heat or cool the home at a time of the lowest cost of energy.

16. The smart thermostat of claim 13, wherein the instructions further cause the smart thermostat to:
obtain a current temperature inside the home;
use the user's personal schedule and the user's location to determine when the user will arrive home;
determine a preferred temperature for the home based on when the user will arrive home;
calculate a deviation between the current temperature inside the home and the preferred temperature for the home;
based on the temperature deviation, select a temperature effecting device to heat or cool the home; and
use the temperature effecting device to adjust the temperature of the home to the preferred temperature.

\* \* \* \* \*